(No Model.)
E. W. MARSH.
SAFETY PLATE FOR STEAM PIPES.
No. 375,885. Patented Jan. 3, 1888.
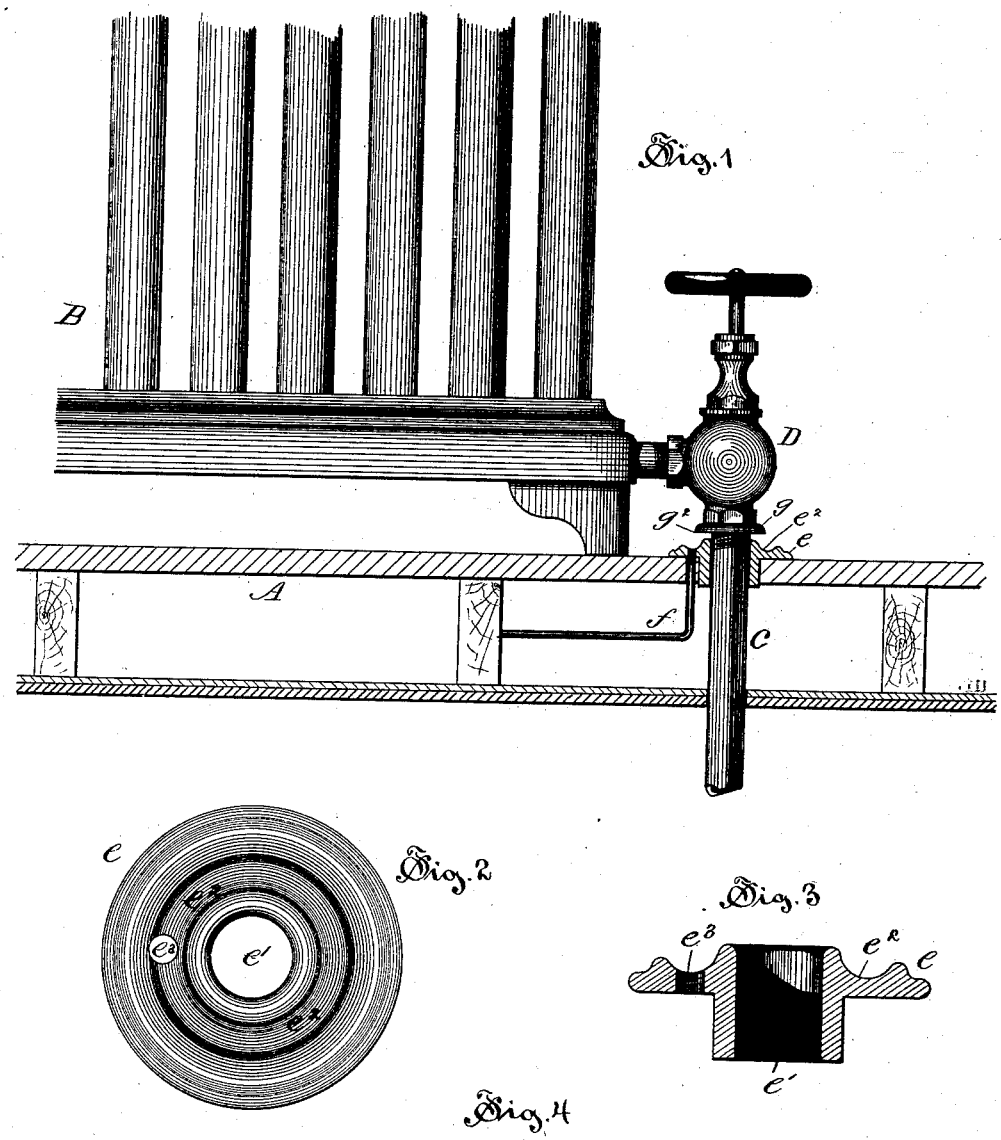
Witnesses:
C. E. Buckland.
Henry L. Rickard.
Inventor,
Edward W. Marsh,
By Harry R. Williams,
his Attorney.

UNITED STATES PATENT OFFICE.

EDWARD W. MARSH, OF HARTFORD, CONNECTICUT.

SAFETY-PLATE FOR STEAM-PIPES.

SPECIFICATION forming part of Letters Patent No. 375,885, dated January 3, 1888.

Application filed October 14, 1887. Serial No. 252,295. (No model.)

*To all whom it may concern:*

Be it known that I, EDWARD W. MARSH, of Hartford, in the county of Hartford and State of Connecticut, have invented certain new and useful Improvements in Safety-Plates for Steam-Pipes, of which the following is a specification.

My invention relates to the class of safety-plates that are used to protect flooring from the heat of steam-pipes that pass through it; and the object of my invention is to provide such a safety-plate with means whereby leakage that may escape from the pipe or a connected valve above the plate is collected and conducted to a waste-pipe to prevent damage that would result should such leakage wet the surrounding objects.

My invention is illustrated in the accompanying drawings, in which—

Figure 1 is a side view of a part of a steam-radiator with inlet pipe and valve, showing my improved safety-plate in position in the floor. Fig. 2 is a plan view, on an enlarged scale, of my improved plate. Fig. 3 is a section of same. Fig. 4 is a section of the drip-washer used in connection with the plate.

Similar letters refer to like parts throughout the views.

A denotes the floor, B a steam-heating radiator, C the inlet-pipe, and D the supply-valve, which several parts are of ordinary material and construction.

The letter $e$ denotes the safety-plate, which has the central opening, $e'$, for the passage of the steam-pipe, and usually the downward-projecting collar, which surrounds the pipe and prevents the latter from coming in contact with the floor. In the upper face of the plate $e$ is formed the annular channel $e^2$, and through the plate, forming an outlet from the bottom of the channel $e^2$, a perforation, $e^3$, is made, the walls of which perforation are preferably threaded to receive the threaded end of a small duct, $f$.

It is difficult to keep a valve tight for any length of time, as the packing soon becomes worn and leakage escapes and runs down the pipe, soaking the surrounding objects with moisture. If there is a carpet on the floor, it soon is damaged. If there is a frescoed ceiling beneath the floor, that is ruined by becoming wet. My improved safety-plate obviates the liability of any such damage. When placed in the floor surrounding the pipe below the valve, the leakage drops into the channel $e^2$ and is discharged through the opening $e^3$ and duct $f$ into any waste-pipe.

In order to prevent the leakage from following down the pipe, I provide a washer, $g$, which has an opening, $g'$, that in the case shown is threaded and screws onto the steam-pipe before the valve is attached. The periphery of this washer is so formed and is of such a size that the leakage will drop from the edge $g^2$ of the periphery into the annular channel $e^2$ of the plate. It is not necessary, however, that this washer be threaded to screw on the pipe, as it may be attached to the bottom of the valve-body; or the bottom of the valve-body may be formed so that the water will drop from it instead of following down the pipe.

My device is simple, cheap, effective, and somewhat ornamental when in place.

I claim as my invention—

1. In combination with a steam-pipe passing through a floor, a valve and a plate surrounding the steam-pipe at the point where it passes through the floor, the said plate having a portion fitted to an opening in the floor and a portion provided with a channel in its upper face, and with a duct leading from said channel, substantially as set forth.

2. In combination with the valve of a steam-radiator, a steam-pipe leading to said valve, a plate surrounding said pipe and provided with an annular channel in its upper face, a duct leading from said channel, and a drip-washer located above the plate, substantially as described.

EDWARD W. MARSH.

Witnesses:
A. B. JENKINS,
H. R. WILLIAMS.